United States Patent
Ferrer et al.

(10) Patent No.: US 8,702,879 B2
(45) Date of Patent: Apr. 22, 2014

(54) METHOD FOR PRODUCING MARTENSITIC STEEL WITH MIXED HARDENING

(75) Inventors: Laurent Ferrer, Lieusaint (FR); Philippe Heritier, Clermont-Ferrand (FR)

(73) Assignees: SNECMA, Paris (FR); Aubert & Duval, Paris (FR)

( * ) Notice: Subject to any disclaimer, the term of this patent is extended or adjusted under 35 U.S.C. 154(b) by 12 days.

(21) Appl. No.: 13/382,045

(22) PCT Filed: Jul. 2, 2010

(86) PCT No.: PCT/FR2010/051400
§ 371 (c)(1),
(2), (4) Date: Feb. 1, 2012

(87) PCT Pub. No.: WO2011/001124
PCT Pub. Date: Jan. 6, 2011

(65) Prior Publication Data
US 2012/0132326 A1    May 31, 2012

(30) Foreign Application Priority Data
Jul. 3, 2009    (FR) .................................. 09 54576

(51) Int. Cl.
*C21D 6/02* (2006.01)
*C21D 8/00* (2006.01)

(52) U.S. Cl.
USPC ........... 148/624; 148/622; 148/648; 148/649; 148/653

(58) Field of Classification Search
USPC ................ 148/328, 648, 649, 622, 624, 653; 420/112, 107, 95
See application file for complete search history.

(56) References Cited

U.S. PATENT DOCUMENTS

| 4,116,729 A | 9/1978 | Katoh et al. |
| 5,393,488 A | 2/1995 | Rhoads et al. |
| 2008/0193321 A1 | 8/2008 | Montagnon et al. |
| 2010/0200119 A1 | 8/2010 | Montagnon |

FOREIGN PATENT DOCUMENTS

| FR | 2 885 141 | 11/2006 |
| WO | 2009 007562 | 1/2009 |
| WO | 2010 007297 | 1/2010 |

OTHER PUBLICATIONS

Machine-English translation of Japanese patent No. 2002-285290, Fuda Kenji et al., Oct. 3, 2002.*
Machine-English translation of Japanese patent No. 2002-161342, Fuda Kenji et al., Jun. 4, 2002.*
International Search Report issued on Oct. 11, 2010 in PCT/FR10/051400 filed on Jul. 2, 2010.
U.S. Appl. No. 13/382,052, filed Jan. 3, 2012, Ferrer.
U.S. Appl. No. 13/501,610, filed Apr. 12, 2012, Ferrer, et al.
U.S. Appl. No. 13/501,377, filed Apr. 11, 2012, Ferrer, et al.
U.S. Appl. No. 13/501,568, filed Apr. 12, 2012, Ferrer, et al.
Office Action mailed Dec. 4, 2013, in Chinese Patent Application No. 201080028861.0, pp. 1-9, (English translation).

* cited by examiner

*Primary Examiner* — Deborah Yee
(74) *Attorney, Agent, or Firm* — Oblon, Spivak, McClelland, Maier & Neustadt, L.L.P.

(57) ABSTRACT

A method of producing a martensitic steel including a content of other metals such that it can be hardened by intermetallic compound and carbide precipitation, with an Al content of between 0.4% and 3%. The heat shaping temperature of a last heat shaping pass of the steel is lower than the solubility temperature of aluminum nitrides in the steel, and a treatment temperature for each potential heat treatment after the last heat shaping pass is lower than the solid-state solubility temperature of the aluminum nitrides in the steel.

3 Claims, 2 Drawing Sheets

METHOD FOR PRODUCING MARTENSITIC STEEL WITH MIXED HARDENING

BACKGROUND OF THE INVENTION

1. Field of the Invention

The present invention relates to a method for producing martensitic steel that comprises a content of other metals such that the steel can be hardened by intermetallic compound and carbide precipitation, with an Al content of between 0.4% and 3%.

2. Description of the Related Art

For certain applications, in particular for airplane engine transmission shafts, it is necessary to use steel having a very high mechanical strength (yield strength) up to 400° C., and at the same time good resistance to brittle fracture (high stiffness and ductility). These steels must also have good fatigue behavior.

One such martensitic steel is known from document U.S. Pat. No. 5,393,488, which includes a content of other metals such that it is capable of being hardened by an intermetallic compound and carbide precipitation. The composition of such a steel by weight is as follows: 10 to 18% of Ni, 8 to 16% of Co, 1 to 5% of Mo, 0.5 to 1.3% of Al, 1 to 3% of Cr, less than 0.3% of C, less than 0.1% of Ti, the rest being Fe.

The drawback of such a steel is its high cost, due to its significance Co content.

Also known as another martensitic steel that comprises the contents of other metals such that it is capable of being hardened by an intermetallic compound and carbide precipitation, the composition of which is given in document FR 2,885,142 as follows (percentages by weight): 0.18 to 0.3% of C, 5 to 7% of Co, 2 to 5% of Cr, 1 to 2% of Al, 1 to 4% of Mo+W/2, traces to 0.3% of V, traces to 0.1% of Nb, traces to 50 ppm of B, 10.5 to 15% of Ni with Ni$\geq$7+3.5 Al, traces to 0.4% of Si, traces to 0.4% of Mn, traces to 500 ppm of Ca, traces to 500 ppm of Rare earths, traces to 500 ppm of Ti, traces to 50 ppm of O (development from molten metal) or to 200 ppm of O (development through powder metallurgy), traces to 100 ppm of N, traces to 50 ppm of S, traces to 1% of Cu, traces to 200 ppm of P, the rest being Fe.

This steel FR 2,885,142 has a very high mechanical strength (breaking load able to go from 2000 MPa to 2500 MPa) and at the same time very good resilience (greater than $180.10^3$ J/m$^2$) as well as a good compromise with the other properties of toughness and fatigue behavior.

However, the results of fatigue tests conducted on this type of steel by the inventors show great dispersion in the bench life values (corresponding to the number of cycles leading to the break of a fatigue test piece in said steel) for each imposed deformation stress level, whether for low-cycle fatigue (stress frequency in the vicinity of 1 Hz) or vibrational fatigue (greater than 50 Hz). Thus, the minimum values, within the statistical meaning, of the fatigue bench life (limiting the bench life of parts made from this steel) are still too low.

BRIEF SUMMARY OF THE INVENTION

The present invention aims to resolve these drawbacks.

The invention aims to propose a method for producing this type of steel that makes it possible to reduce the fatigue behavior dispersion of this type of steel, and to increase its average fatigue behavior value.

This aim is achieved owing to the fact that the method is such that the heat shaping temperature for the last heat shaping pass is less than the solubility temperature of the aluminum nitrides in said steel, and the heat treatment temperature for each optional heat treatment after said last heat shaping pass is less than the solid-state solubility temperature of the aluminum nitrides in said steel.

In this way, after the last heat shaping pass (for example, forging), the number of unwanted aluminum nitride precipitates per surface unit of steel in the form of tabs (or needles) is statistically negligible, and can be estimated at less than $10^{-12}$ units per mm$^2$.

In fact, the inventors have noted that among the precipitates of aluminum nitrides (AlN), it is those in the form of tabs (or needles) that are undesirable, as they act as strain concentrating sites when this steel is subjected to fatigue stresses, and thereby reduce the energy necessary for spreading cracks to start. The inventors have also noted that unwanted AlN precipitates form when the aluminum and nitrogen recombine during cooling from a temperature higher than the solid-state solubility temperature of the AlN precipitates.

Owing to the method according to the invention, unwanted AlN precipitates do not form during the last heat shaping pass (for example, forging), since the latter is done at a temperature lower than the solid-state solubility temperature of said precipitates. Furthermore, any unwanted AlN precipitates present in the steel before this last heat shaping pass (formed during earlier operations that may have been done at a temperature higher than the solid-state solubility temperature of the AlN) are broken by said last heat shaping pass into pieces whereof the dimensions are of the same order of magnitude in the three spatial directions, and that are spaced apart from one another. These pieces are thus not very capable of being sites for cracks to begin that would lead to premature ruin of the steel.

As a result, the proportion of unwanted AlN precipitates (precipitates in the form of tabs or needles) at the end of the last heat shaping pass is negligible, such that these precipitates can no longer serve as starting sites for cracks. Furthermore, these unwanted AlN precipitates do not reform after the last heat shaping pass, since the steel no longer goes above the solid-state solubility temperature of the AlN during any later heat treatments. This therefore results in an increase in the minimum fatigue bench life values, as well as the average of the fatigue bench life durations.

The invention also relates to a metal steel comprising a content of other metals such that it is capable of being hardened by an intermetallic compound and carbide precipitation, with an Al content of between 0.4% and 3%.

According to the invention, if the last heat shaping pass is done below the solid-state solubility temperature of the aluminum nitrides and the treatment temperature for each optional heat treatment after said last heat shaping pass is less than the solid-state solubility temperature, the number of these precipitates having an unwanted shape (tabs or needles) per surface unit of the steel is statistically less than $10^{-12}$. As a result, the dispersion of the results in number of fatigue cycles will be reduced, resulting in a longer lifetime of a piece made from said steel.

BRIEF DESCRIPTION OF THE SEVERAL VIEWS OF THE DRAWINGS

The invention will be better understood and its advantages will better appear upon reading the following detailed description of one embodiment shown as a non-limiting example. The description is done in reference to the appended drawings, in which.

DETAILED DESCRIPTION OF THE INVENTION

Figure 1:
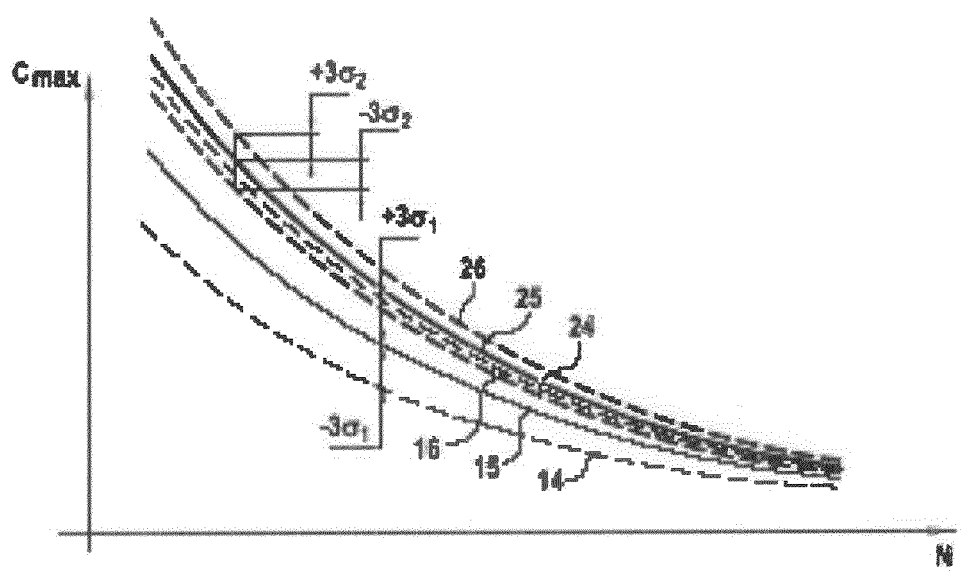
FIG. 1 compares fatigue bench life curves for a steel according to the invention and a steel according to the prior art.

We will consider martensitic steels with mixed hardening with a content of Al of between 0.4% and 3%. It is their content of Al and of other metals that allows these steels to be hardened by an intermetallic compound and carbide precipitation (mixed hardening).

Fatigue tests on test pieces of these steels produced according to the prior art have shown great dispersion in the results of those tests, i.e. for a given fatigue stress strain, the bench life varies over a wide range. The width of this range, specifically the low values of this range, is due to the presence of these unwanted precipitates that require less energy to start fatigue cracks, and leads to premature breaking of the steel.

Due to its chemical composition, the steel contains primary precipitates of AlN that form during solidification of the metal, at a high temperature, when this steel is still in the paste phase (i.e. in the two mixed solid and liquid states of the steel). Their quantity is below $10^{-2}$ units per mm$^2$. This primary precipitation occurs in the form of precipitates whereof the dimensions are of the same order of magnitude in all three spatial directions (i.e. these precipitates have a substantially spherical shape), and the size of which does not exceed 50 µm. The beginning of cracks from these primary AlN precipitates requires more energy (than from the secondary precipitates, see below) and therefore does not generate minimal fatigue bench life values.

The inventors noticed that the steel according to the prior art also contains AlN precipitates distinct from the primary precipitates, which are called secondary precipitates. These secondary precipitates are present in a lower proportion (less than $10^{-2}$ units per mm$^2$) than the primary precipitates. It is these secondary precipitates that are responsible for premature breaking of the steel. The inventors noted that the secondary precipitates have an unwanted tab (or needle) shape characterized by their dimensions in all three directions:

a) the smallest dimension being smaller than one twentieth of the largest dimension, and b) the largest dimension being larger than 10 µm. These secondary precipitates act as strain concentrating sites, and therefore as favored locations for cracks to start, since cracks require less energy to form on these secondary precipitates than on the primary precipitates. Cracks therefore form prematurely on the secondary precipitates, and lead to a decrease in the bench life of the steel piece (which corresponds to the low values of the test result range).

The inventors have also noted that in solid steel, a second solubility temperature exists for the aluminum nitrides AlN (depending on the chemical composition), called solid-state solubility temperature, and that the secondary AlN precipitates form during cooling of the steel from a temperature higher than said solid-state solubility temperature of the AlN precipitates in the steel. In fact, when the steel goes above the solubility temperature, a low proportion of the primary AlN precipitates dissolve. Then, when the temperature goes back below this temperature during cooling of the steel, the dissolved aluminum and nitrogen recombine into secondary AlN precipitates.

For example, this solid-state solubility temperature is equal to 1025° C. in the case of a steel whereof the composition is covered by patent FR 2,885,142 and is provided above.

Thus, if the forging temperature of the last heat shaping pass is lower than the solid-state solubility temperature of the AlN precipitates in the solid steel, then the AlN precipitates remain in that state (the aluminum and nitrogen do not dissolve). Secondary AlN precipitates therefore do not form.

Furthermore, any secondary AlN precipitates that may be present before the last forging pass (which may result from prior heat treatments done above the solid-state solubility temperature) tend on the one hand to be broken by the forging operation into smaller precipitates, the shape of which has equivalent dimensions in all three spatial directions (unlike an unwanted shape (tab or needle)), and on the other hand to be spaced apart from one another. Consequently, the heat shaping operation below with the solid-state solubility temperature of the AlN precipitates transforms the harmful secondary precipitates into precipitates more similar to primary precipitates, and which are therefore less harmful for the fatigue bench life of the steel.

The inventors have performed tests on steels produced using the method according to the invention, i.e. with a last heat shaping pass temperature lower than the solid-state solubility temperature of the AlN precipitates in the steel (and no subsequent heat treatment above that temperature), and the results of those tests are presented below.

FIG. 1 qualitatively shows the improvements resulting from the method according to the invention. One determines the value of the number N of break cycles necessary to break a steel test piece subject to a cyclical pulling stress as a function of the pseudo-alternating stress C (this is the stress undergone by the test piece under an imposed deformation, according to Snecma standard DMC0401 used for these tests).

Figure 2:
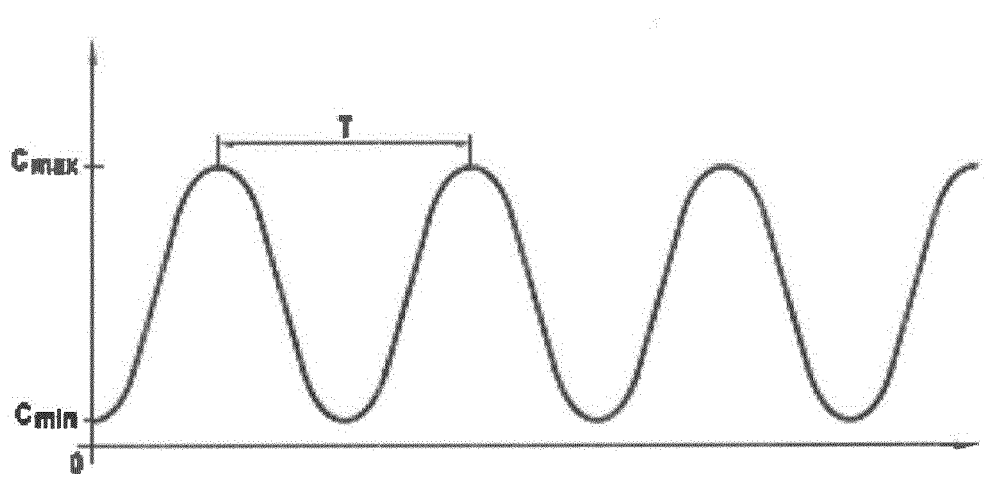
FIG. 2 shows a fatigue stress curve.

One such cyclical stress is diagrammatically illustrated in FIG. 2. The period T represents one cycle. The strain evolves between a maximum value $C_{max}$ and a minimum value $C_{min}$. By fatigue testing a statistically sufficient number of test pieces, the inventors obtained points N=f(C) from which they drew a mean statistical curve C-N (strain $C_{max}$ as a function of the number N of fatigue cycles). The standard deviations over the strains are then calculated for a given number of cycles.

In FIG. 1, the first curve 15 (thin line) is (diagrammatically) the mean curve obtained for a steel produced according to the prior art. This first mean curve C-N is surrounded by two curves 16 and 14 in broken thin lines. These curves 16 and 14 are respectively situated at a distance of +3 $\sigma_1$ and −3 $\sigma_1$ from the first curve 15, $\sigma_1$ being the standard deviation of the distribution of the experimental points obtained during these fatigue tests, and ±3$\sigma_1$ statistically corresponds to a confidence interval of 99.7%. The distance between these two curves 14 and 16 shown in broken lines is therefore a measurement of the dispersion of the results. The curve 14 is the limiting factor for the dimensions of a piece.

In FIG. 1, the second curve 25 (thick line) is (diagrammatically) the mean curve obtained from the results of fatigue tests performed on the steel produced according to the invention under a stress according to FIG. 2. This second mean curve C-N is surrounded by two curves 26 and 24 in broken thick lines, respectively situated at a distance of +3 $\sigma_2$ and −3 $\sigma_2$ from the second curve 25, $\sigma_2$ being the standard deviation of the distribution of the experimental points obtained during these fatigue tests. The curve 24 is the limiting factor for the dimensions of the piece.

It will be noted that the second curve 25 is situated above the first curve 15, which means that under a fatigue stress at a strain level $C_{max}$, the steel test pieces produced according to the invention break on average at a higher number N of cycles than that where the steel test pieces according to the prior art break.

Furthermore, the distance between the two curves 26 and 24 shown in broken thick lines is smaller than the distance between the two curves 16 and 14 shown in broken thin lines, which means that the fatigue behavior dispersion of the steel produced according to the invention is lower than that of the steel according to the prior art.

Thus, for a given strain, the curve 14 relative to a steel produced according to the prior art yields lower bench life values for a piece than the curve 24 relative to a steel produced according to the invention.

FIG. 1 illustrates the experimental results summarized in tables 1 and 2 below.

Table 1 provides the results for a low-cycle fatigue stress according to FIG. 2 with a zero strain $C_{min}$, at different temperatures: 20° C., 200° C., and 400° C. A low cycle fatigue means that the stress frequency is in the vicinity of 1 Hz (the frequency being defined as the number of periods T per second).

It will be noted that for a given value of the number N of cycles, the average fatigue strain value necessary to break a steel according to the invention is higher than the mean fatigue strain value M (set at 100%) necessary to break a steel according to the prior art. The dispersion (=6 σ) of the results at that number N of cycles for a steel according to the invention is lower than the dispersion of the results for a steel according to the prior art (dispersions expressed in percentage of the mean value M).

TABLE 1

| Low cycle fatigue test conditions | | Steel according to the prior art | | Steel produced according to the invention | |
|---|---|---|---|---|---|
| N | Temperature | C | Dispersion | C | Dispersion |
| $10^5$ | 20° C. | 100% M | 40% M | 125% M | 20% M |
| $10^5$ | 200° C. | 100% M | 30% M | 137% M | 15% M |
| $3 \cdot 10^4$ | 400° C. | 100% M | 40% M | 112% M | 15% M |

Table 2 provides the results for a vibrational fatigue stress, i.e. a frequency of approximately 80 Hz, at 200° C. The stress is identical to that of FIG. 2 with a non-zero minimum strain $C_{min}$ (fraction of the maximum strain $C_{max}$).

It will be noted that for a given value of the number N of cycles, the mean fatigue strain value necessary to break a steel according to the invention is higher than the mean fatigue strain value M necessary to break a steel according to the prior art. The dispersion of the results at that number N of cycles for a steel according to the invention is lower than the dispersion of the results for a steel according to the prior art.

It will be noted that the minimum value $C_{min}$ has very little influence over the results.

TABLE 2

| Vibrational fatigue test conditions | | | Steel according to the prior art | | Steel produced according to the invention | |
|---|---|---|---|---|---|---|
| N | Temperature | $C_{min}$ | C | Dispersion | C | Dispersion |
| $4 \cdot 10^6$ | 200° C. | $C_{max}/20$ | 100% = M | 30% M | 120% M | 12% M |
| $4 \cdot 10^6$ | 200° C. | $C_{max}/2$ | 100% = M | 30% M | 126% M | 14% M |

The results of these tests therefore show that it is indeed the secondary AlN precipitates in the steel according to the prior art, formed during the last heat shaping pass at a temperature above the solid-state solubility temperature of those precipitates in the steel, that are responsible for the low fatigue bench life values of that steel.

The SEM (scanning electron microscope) observations done by the inventors on many steel test pieces according to the prior art and according to the invention corroborate these findings.

Figure 3:
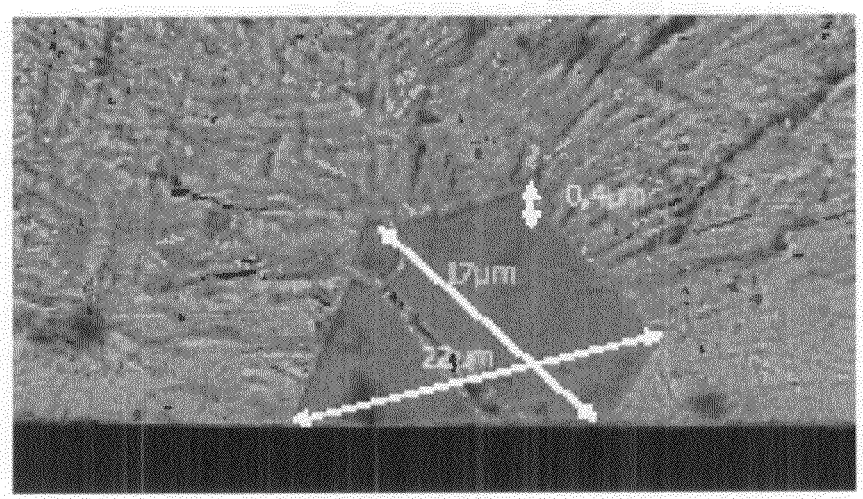
FIG. 3 is a scanning electron microscope photograph of a secondary precipitate in a steel according to the prior art.

FIG. 3 is an SEM fractography of the fracture surface of a steel test piece according to the prior art. A secondary precipitate can be seen there. This precipitate assumes the form of a tab whereof the dimensions, indicated in the figure, are 17 μm and 22 μm for a thickness of 0.4 μm. These secondary precipitates are present in significant quantities in the steel according to the prior art, and are practically absent from steel according to the invention.

Figure 4:
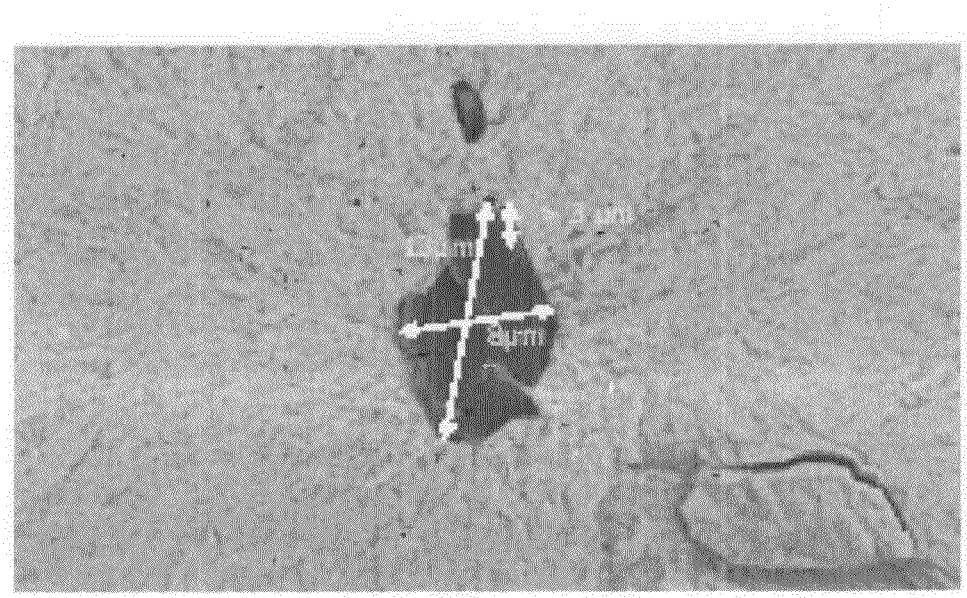
FIG. 4 is a scanning electron microscope photograph of a primary precipitate in a steel according to the invention.

FIG. 4 is an SEM fractography of the fracture surface of the steel test piece according to the invention. A primary precipitate can be seen there. This precipitate has a substantially three-dimensional shape, and its dimensions, indicated in the figure, are of the same order of magnitude: 13 μm×8 μm×3 μm.

Advantageously, not only is the temperature of the last heat shaping pass lower than the solid-state solubility temperature of the aluminum nitrides in the steel, but the heat shaping temperature of each of the heat shaping passes before the last heat shaping pass is also lower than that solid-state solubility temperature.

Thus, substantially no harmful secondary precipitates form throughout the steel production method.

For example, the Al content of the steel is between 0.5% and 2%.

For example, in the steel, the C content is less than 0.4%, the Cr content is between 0.5% and 7%, the Ni content is between 6% and 18%, and the Co content is between 4% and 18%.

A piece can be made from a martensitic steel according to the invention. For example, this piece is an engine transmission shaft, in particular for an airplane engine.

The invention claimed is:

1. A method for producing martensitic steel that comprises alloying elements such that the steel can be hardened by an intermetallic compound and carbide precipitation, with an Al content of between 0.4% and 3%, the method comprising:
   subjecting the steel to heat shaping, wherein:
   a heat shaping temperature for a last heat shaping pass is less than solid-state solubility temperature of aluminum nitrides in the steel;
   a heat shaping temperature of each of the heat shaping passes preceding a last heat shaping pass is less than the solid-state solubility temperature of the aluminum nitrides in the steel; and
   the heat treatment temperature for each optional heat treatment after the last heat shaping pass is less than the solid-state solubility temperature of the aluminum nitrides in the steel.

2. The production method according to claim 1, wherein the Al content of the steel is between 0.5% and 2%.

3. The production method according to claim 1, wherein in the steel, the C content is less than 0.4%, the Cr content is between 0.5% and 7%, the Ni content is between 6% and 18%, the Co content is between 4% and 18%.

* * * * *